United States Patent [19]

Fukui

[11] 4,355,330
[45] Oct. 19, 1982

[54] X-RAY TELEVISION SYSTEM

[75] Inventor: Hiroyuki Fukui, Nishinasuno, Japan

[73] Assignee: Tokyo Shibaura Denki Kabushiki Kaisha, Japan

[21] Appl. No.: 116,921

[22] Filed: Jan. 30, 1980

[30] Foreign Application Priority Data

Feb. 5, 1979 [JP] Japan .............................. 54-11392

[51] Int. Cl.³ .......................... H04N 7/18; H04N 5/32
[52] U.S. Cl. ..................................... 358/111; 358/180; 378/99
[58] Field of Search ........................... 358/111, 180; 250/416 TV

[56] References Cited

U.S. PATENT DOCUMENTS 3,535,443 10/1970 Rieke ................................... 358/111
4,210,812 7/1980 Ando ................................... 358/111

FOREIGN PATENT DOCUMENTS 1210035 2/1966 Fed. Rep. of Germany ...... 358/111
2121333 11/1971 Fed. Rep. of Germany .

OTHER PUBLICATIONS

Toshiba Review, No. 43, Jul.-Aug. 1969, "Latest Diagnostic System for Circulatory Organs", pp. 24-29, Nakaskika et al.

Primary Examiner—Howard W. Britton
Attorney, Agent, or Firm—Finnegan, Henderson, Farabow, Garrett & Dunner

[57] ABSTRACT

An X-ray image from an image intensifier is projected on an image pickup surface of a television camera. The television camera converts the X-ray image into a video signal. The video signal is reproduced as an X-ray image on a monitor television. In ordinary fluoroscopic photographing, the video signal is blanked, and supplied to the monitor television. In cine-photographing, on the other hand, the X-ray image, constricted by an X-ray stop, is projected on the television camera, a scanning region substantially identical with the constricted X-ray image is scanned, and a video signal corresponding to such X-ray image is supplied to the monitor television without being blanked.

7 Claims, 6 Drawing Figures

X-RAY TELEVISION SYSTEM

This invention relates to an X-ray television system capable of monitoring by means of a television in X-ray diagnosis.

With conventional X-ray television systems, X-rays transmitted through a subject are received and converted into a fluorescent image by an image intensifier, and such fluorescent image is picked up by a television camera through an optical system. A video signal from the television camera is transmitted to a monitor television, whereby the fluorescent image i.e. X-ray image is reproduced. According to such prior art X-ray television system, the fluorescent image on the image intensifier, which is projected on an image pickup tube of the television camera through the optical system, is circular, so that a circular fluorescent image is formed within a circular photoconductive screen of the image pickup tube. When the formed circular fluorescent image is scanned with the scanning line of the television camera, a substantially square region circumscribed about the image is inclusively scanned. Therefore, when a picture is reproduced on the monitor television, no information will be included in other scanning regions than the region of the output image (fluorescent image) of the image intensifier. Accordingly, a mask is put on the screen of the monitor television to comply with the diameter of the output image, or the scanning regions other than the region of the reproduced picture corresponding to the fluorescent image is shaded by circle-blanking the video signal. In a diagnosis on a circulatory disease, however, when performing cine-photographing (short-time continuous photographing) after inserting a catheter in an objective part, such as the heart, the image is reduced to a rectangle by an X-ray stop in front of an X-ray tube in order to remove scattered beams around the image. Consequently, the picture to be reproduced on the monitor television will be a rectangular image inscribed in the aforesaid circular image. Namely, both in ordinary fluoroscopic photographing and in cine-photographing, the area of the actually reproduced picture or the usual picture area will be reduced as compared with the reproducible picture area of the monitor television. In other words, the screen regions around the usual picture area are rendered futile, so that the usual picture area becomes too small to maintain the good resolution of the reproduced picture, possibly leading to wrong diagnoses.

Accordingly, the object of this invention is to provide an X-ray television system capable of increasing the usual picture area of a monitor television.

According to this invention, there may be provided an X-ray television system in which a video signal is blanked without reducing the X-ray irradiation field in ordinary fluoroscopic photographing, and, in cine-photographing, an image corresponding to the X-ray irradiation field, which is reduced in this case, is scanned so as to be substantially identical with the usual picture area of the monitor television, and a blanking means for the video signal is released.

This invention can be more fully understood from the following detailed description when taken in conjunction with the accompanying drawings, in which.

Figure 1:
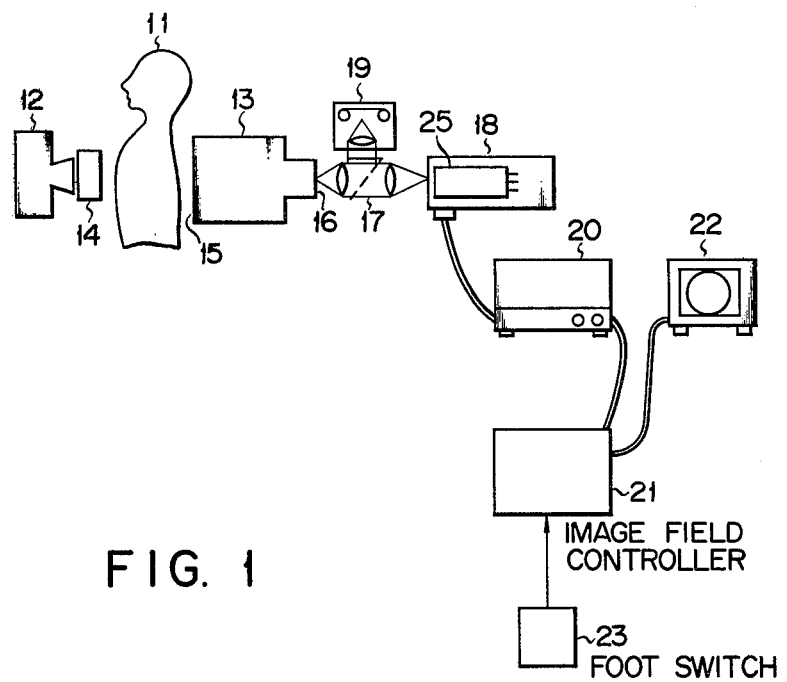
FIG. 1 shows an X-ray television system according to an embodiment of this invention.

Referring now to the drawing of FIG. 1, there are shown an X-ray tube 12 and an image intensifier 13 which face each other with a subject 11 between. An X-ray stop 14 is disposed between the X-ray tube 12 and the subject 11. The image intensifier 13 has an input fluorescent screen 15 facing the subject 11 and an output fluorescent screen 16 facing a television camera 18 with an optical system 17 between. A cinecamera 19 for cine-photographing is disposed opposite the optical system 17. The television camera 18 is connected to a television camera controller 20, which is connected to an image field controller 21. The image field controller 21 is connected to a monitor television 22 and a foot switch 23.

Figure 2:
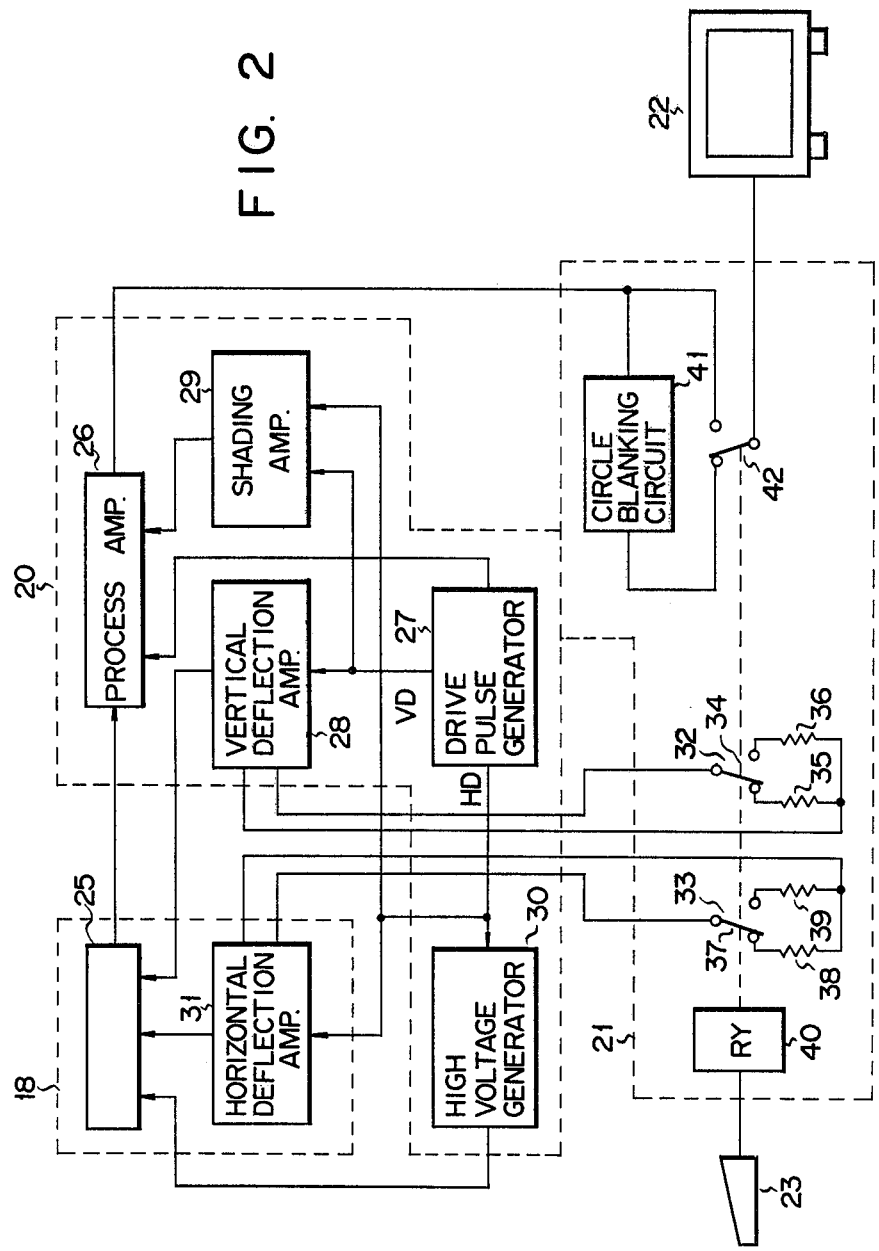
FIG. 2 is a circuit diagram of a reproduction system of the X-ray television system of FIG. 1.

In the above-mentioned X-ray television system, a reproduction system including the television camera 18, camera controller 20, image field controller 21, monitor television 22, and the foot switch 23 has such configuration as shown in FIG. 2. That is, the output terminal of an image pickup tube 25 of the television camera 18 is connected to a process amplifier 26 of the camera controller 20. The camera controller 20 is provided with a drive pulse generator 27 which is connected to a vertical deflection amplifier 28 and a shading amplifier 29 to supply a vertical drive signal VD to these amplifiers. Also, the drive pulse generator 27 is connected to the process amplifier 26 to supply the same with blanking pulse, clamp pulse and synchronizing pulse. Moreover, the drive pulse generator 27 is connected to the shading amplifier 29, a high voltage generator, and a horizontal deflection amplifier 31 of the television camera 18 to supply a horizontal drive signal HD to these components. The output terminal of the shading amplifier 29 is connected to the process amplifier 26. The output terminals of the vertical deflection amplifier 28, high voltage generator 30 and horizontal deflection amplifier 31 are connected to the image pickup tube 25. The vertical and horizontal amplitude circuits (not shown) of the vertical and horizontal deflection amplifiers 28 and 31 are connected with vertical and horizontal amplitude adjusting circuits 32 and 33, respectively. The vertical amplitude adjusting circuit 32 is composed of a relay switch 34 of a relay 40 and resistors 35 and 36 which are connected to the normally-closed and -open contacts of the relay switch 34, respectively. Likewise, the horizontal amplitude adjusting circuit 33 is composed of a relay switch 37 and resistors 38 and 39. On the other hand, the output terminal of the process amplifier 26 is connected to the input terminal of a circle blanking circuit 41 in the image field controller 21 and the normally-open contact of a relay switch 42. The normally-closed contact of the relay switch 42 is connected to the output terminal of the circle blanking circuit 41, and the common contact is connected to the monitor television 22.

Figure 3A:
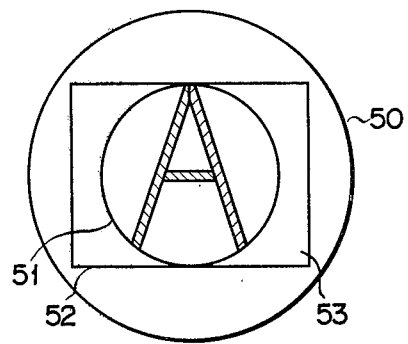
FIG. 3A shows an image of a subject on the image pickup surface of an image pickup tube which is provided by ordinary fluoroscopic photographing.
Figure 3B:
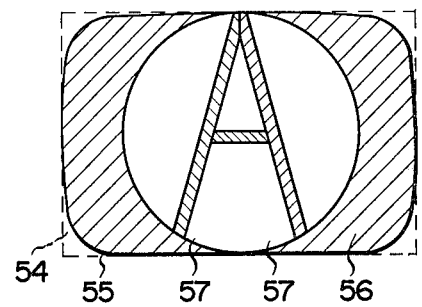
FIG. 3B shows a subject image on the screen of a monitor television which is provided by ordinary fluoroscopic photographing.

In performing ordinary fluoroscopic photographing by using the above-mentioned X-ray television system, the foot switch 23 is turned off. In this state, when X-rays from the X-ray tube 12 fall upon the input fluorescent screen 15 of the image intensifier 13 through the X-ray stop 14 and subject 11, an X-ray image appearing on the output fluorescent screen 16 of the image intensifier 13 is formed at the image pickup tube 25 of the television camera 18 by means of the optical system 17, as shown in FIG. 3A. Namely, a circular X-ray image 51 is formed on an image pickup surface or photoconductive screen 50 of the image pickup tube 25. In the photoconductive screen 50, a rectangular region 52 with a length-to-breadth ratio of 3:4 is scanned with an electron beam which is deflected by vertical and horizontal deflection signals from the vertical and horizontal deflection amplifiers 28 and 31. A video signal corresponding to the scanning region 52 is supplied to the process amplifier 26. In response to the blanking pulse, clamp pulse and synchronizing pulse from the drive pulse generator 27, the process amplifier 26 performs processing which corresponds to the video signal. That is, the video signal is so processed that, in FIG. 3A, a portion 53 of the scanning region other than the region of the circular X-ray image 51 is shaded. A circle-blanked video signal from the circle blanking circuit 41 is supplied to the monitor television 22 via the relay switch 42. An image corresponding to the scanning region 52 of the photoconductive screen 50 is reproduced on a screen 54 of the monitor television 22. As a result, the rectangular region 54 with the length-to-breadth ratio of 3:4 is scanned, as shown in FIG. 3B. In this case, however, an actual television screen 55 corresponds to a region inscribed in the outside frame of the rectangular region 54. A peripheral portion 56 is blanked out by the circle blanking circuit 41, and a circular picture 57 corresponding to the circular X-ray image 51 is projected on the screen 55. Thus, in the case of the ordinary fluoroscopic photographing, the circular X-ray image which is obtained without X-ray stopping is picked up within the television screen region with the length-to-breadth ratio 3:4, blanked, and reproduced on the monitor television.

Figure 4A:
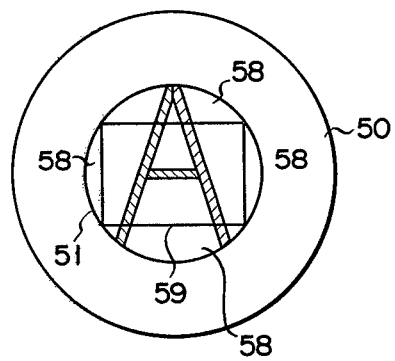
FIG. 4A shows a subject image on the image pickup surface of the image pickup tube which is provided by cine-photographing.
Figure 4B:
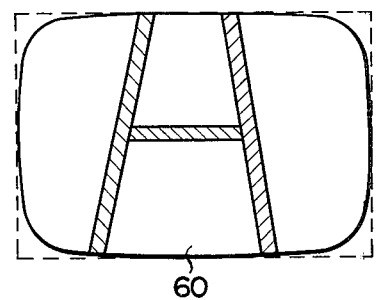
FIG. 4B shows a subject image on the screen of the monitor television which is provided by cine-photographing.

Now there will be described the case cine-photographing. In order to prevent deterioration of the quality of picture due to beam scattering, in the cine-photographing, the irradiation field is reduced by the X-ray stop 14 to a region 59 obtained by removing a peripheral portion 58 from the circular X-ray image 51, as shown in FIG. 4A. Namely, the region 59 which is inscribed in the outside frame of the circular X-ray image 51 is defined as the usual picture area. Hereupon, when the foot switch 23 is turned on, the relay 40 is energized to switch the relay switches 34, 37 and 42 of the relay 40. As a result, the resistors 35 and 38 of the amplitude adjusting circuits 32 and 33 are cut off, and the resistors 36 and 39 are connected to the deflection amplifiers 28 and 31, when the circle blanking circuit 41 is released. By switching the resistors of the amplitude adjusting circuits 32 and 33, the amplitudes of the vertical and horizontal deflection signals are so set as to make the scanning region coincident with the usual picture region 59. When the region 59 is scanned, and a video signal corresponding to an X-ray image within the region 59 is delivered from the image pickup tube 25 and supplied to the monitor television 22 via the process amplifier 26 and relay switch 42, a picture 60 corresponding to the X-ray image within the region 59 is reproduced on the television screen, as shown in FIG. 4B. Thus, in the case of the cine-photographing, the central portion of the circular X-ray image 51 is enlargedly projected over the whole length and breadth of the television screen, so that the whole region of the monitor television capable of display may be utilized effectively, and that the resolution is improved as well. Moreover, since the picture on the television screen is substantially coincident with a picture which is directly stored in a film for cine-photographing by means of the cinecamera 19, the necessary information for a diagnosis will never fail to be recorded.

Although in the above-mentioned embodiment the scanning range of the scanning lines of the television camera and camera controller are changed when the foot switch is turned on, it can be achieved also by replacing a secondary-side lens of the optical system by one with a greater focal length. Alternatively, the stopping and scanning actions can accurately be followed up by switching the horizontal and vertical amplitude adjusting resistors in accordance with the stopping action of the X-ray stop. It is also effective to interlock the X-ray stop and scanning size switching relay with the foot switch. The amplitude adjusting resistors may otherwise be built in the television camera or camera controller. Furthermore, an electronic switching circuit may be used in place of the relay, and any other switch than the foot switch may be utilized without limitation.

What is claimed is:

1. An X-ray television system comprising:
an X-ray generator to emit X-rays;
an X-ray stop for selectively reducing the irradiation field of the X-rays emitted from said X-ray generator;
an image intensifier to convert the X-rays transmitted through a subject into an X-ray image;
a television camera including an image pickup surface to pick up the X-ray image from said image intensifier and a scanning means for scanning the scanning region of said image pickup surface and converting said X-ray image into a video signal;
a means for supplying a scanning signal to the scanning means of said television camera;
a means for blanking the video signal from said television camera;
a scanning region adjusting means for adjusting the size of the scanning region of said image pickup surface;
a means for selecting one of ordinary fluoroscopic photographing and cine-photographing; and
a means driving said blanking means in the ordinary fluoroscopic photographing and releasing said blanking means and driving said scanning region adjusting means in a direction to reduce said scanning region in the cine-photographing, in response to said selecting means.

2. An X-ray television system according to claim 1, wherein said scanning signal supply means is composed of horizontal and vertical deflection circuits respectively generating horizontal and vertical deflection signals, and said scanning region adjusting means is formed of a means to change the waveforms of said horizontal and vertical deflection signals in accordance with the operating state of said driving means.

3. An X-ray television system according to claim 2, wherein said waveform changing means is composed of a plurality of resistance elements connected to said horizontal and vertical deflection circuits and switched in accordance with the operating state of said driving means.

4. An X-ray television system according to claim 1, wherein said scanning region adjusting means adjusts said scanning region to a size corresponding to the irradiation field reduced by said X-ray stop in said cinephotographing.

5. An X-ray television system according to claim 1, wherein said image intensifier projects the X-ray image in a circle on the image pickup surface of said television camera, and said scanning region adjusting means controls said scanning means so as to scan the scanning region surrounding said circular X-ray image.

6. An X-ray television system according to claim 5, wherein said blanking means is formed of a circle blanking circuit to blank the video signal corresponding to a scanning region other than the scanning region which corresponds to said circular X-ray image.

7. An X-ray television system according to claim 1, wherein said X-ray stop reduces the X-ray irradiation field to a rectangular region inscribed in said circular X-ray image.

* * * * *